(12) United States Patent
Zhang et al.

(10) Patent No.: US 12,722,952 B1
(45) Date of Patent: Sep. 1, 2026

(54) MATERIAL HANDLING EQUIPMENT, CONTROLLER AND POSE DETECTION METHOD

(71) Applicant: VisionNav Robotics USA Inc., Acworth, GA (US)

(72) Inventors: Zhenpeng Zhang, Acworth, GA (US); Bingchuan Yang, Acworth, GA (US); Chen Wang, Acworth, GA (US)

(73) Assignee: VISIONNAV ROBOTICS USA INC., Acworth, GA (US)

( * ) Notice: Subject to any disclaimer, the term of this patent is extended or adjusted under 35 U.S.C. 154(b) by 0 days.

(21) Appl. No.: 19/304,933

(22) Filed: Aug. 20, 2025

(51) Int. Cl.
*B66F 9/075* (2006.01)
*G06T 7/73* (2017.01)

(52) U.S. Cl.
CPC .............. *B66F 9/0755* (2013.01); *G06T 7/73* (2017.01); *G06T 2207/10028* (2013.01); *G06T 2207/30261* (2013.01)

(58) Field of Classification Search
None
See application file for complete search history.

(56) References Cited

U.S. PATENT DOCUMENTS

2018/0304468 A1* 10/2018 Holz ...................... B25J 9/1697
2021/0264634 A1* 8/2021 Jelavic .................... G06T 7/149
2023/0186518 A1* 6/2023 Chou ........................ G06T 7/80 382/103
2024/0354992 A1* 10/2024 Lee ........................ G01S 13/89
2024/0377535 A1* 11/2024 Park ........................ G01S 17/74
2025/0028052 A1* 1/2025 Klam .................... G01S 7/4817

FOREIGN PATENT DOCUMENTS

CN 114820391 A 7/2022
CN 117601129 A 2/2024

* cited by examiner

*Primary Examiner* — Leon Viet Q Nguyen
(74) *Attorney, Agent, or Firm* — MUNCY, GEISSLER, OLDS & LOWE, P.C.

(57) ABSTRACT

Some embodiments of the present disclosure relate to material handling equipment, a controller and a pose detection method. The material handling equipment includes a controller, and the controller is configured to execute a program instruction to implement the following actions: acquiring a point cloud of a detection object provided with one or more reflective components; extracting, from the point cloud of the detection object, point clouds corresponding to the one or more reflective components; determining a target plane region according to the point clouds corresponding to the one or more reflective components; and determining a pose of the detection object according to a pose of the target plane region. Compared with the prior art, the material handling equipment, the controller and the pose detection method provided by some embodiments of the present disclosure improve the universality, accuracy and efficiency of the detection object recognition in warehouse logistics.

19 Claims, 8 Drawing Sheets

MATERIAL HANDLING EQUIPMENT, CONTROLLER AND POSE DETECTION METHOD

TECHNICAL FIELD

The present disclosure generally relates to the technical field of warehouse logistics, and more particularly relates to material handling equipment, a controller and a pose detection method.

BACKGROUND

In the field of modern logistics warehousing, the efficient circulation of cargo is very important for the operation of enterprises. As a new generation of intelligent logistics equipment, automated guided forklifts are gradually becoming one of the key technologies for improving warehousing efficiency and lowering operation costs. The automated guided forklift, also known as Automated Guided Vehicle (AGV), relies on autonomous driving technology and intelligent algorithm control, can achieve autonomous navigation, handling and stacking, effectively solves the problem of manpower shortage, and significantly improves the overall efficiency of logistics operations. With the continuous expansion of warehousing scales and increasingly diverse types of cargo, how to help the automated guided forklift accurately and safely handle cargo has become an important direction for the industry to continuously explore and practice. This not only relates to the improvement of warehouse management efficiency, but also is a key link of intelligent transformation of the logistics industry.

BRIEF DESCRIPTION OF THE DRAWINGS

Drawings necessary for describing embodiments of the present disclosure will be briefly illustrated below to facilitate the description of the embodiments of the present disclosure. Obviously, the drawings described below are only some embodiments of the present disclosure. Those skilled in the art may still acquire drawings of other embodiments based on examples shown in these drawings without creative efforts.

DETAILED DESCRIPTION OF THE DISCLOSURE

Figure 1:
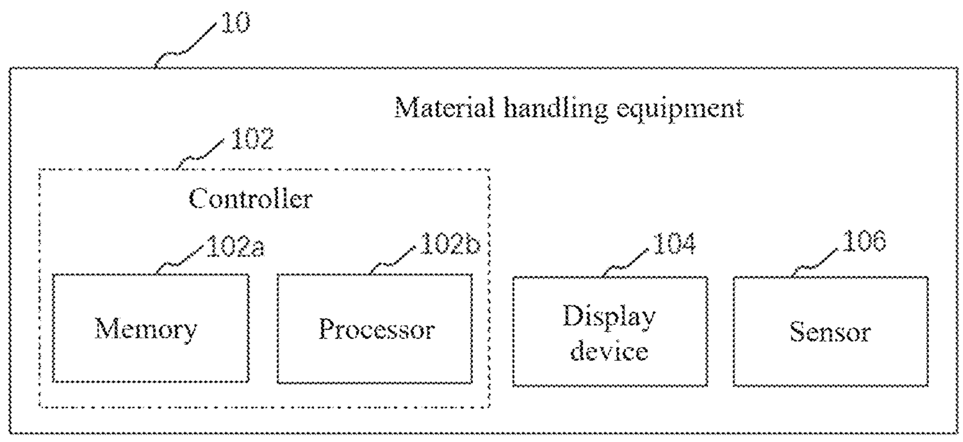
FIG. 1 is a schematic diagram of a module of material handling equipment provided by some embodiments of the present disclosure.

The following description in conjunction with the accompanying drawings is provided to help understand the present disclosure. The following discussion will focus on specific implementations and embodiments of the present disclosure. This key point is provided to help describe the teaching content and should not be interpreted as a limitation to the scope or applicability of this teaching content. However, other embodiments may be used based on the teaching content disclosed in the present disclosure.

The terms "include" and "have" and any of their variations in the present disclosure are intended to cover non-exclusive inclusion. For example, a process, method, system, device, product, or equipment that includes a series of actions or units is not limited to the clearly listed actions or units; and instead, may further optionally include an action or unit that is not clearly listed, or may further optionally include other actions or units that are intrinsic to the process, method, system, device, product, or equipment.

The following disclosure provides various implementations or examples that may be used to achieve different features of the present disclosure. The specific examples of components and configurations described below are used to simplify the present disclosure. It should be known that these statements are merely illustrative and are not intended to limit the present disclosure. For example, in the description below, the terms "first", "second", and so on are intended to distinguish different objects but do not necessarily indicate a specific order of the described objects. For example, without departing from the scope of the present disclosure, a first parameter may be referred to as a second parameter, and similarly, the second parameter may be referred to as the first parameter. In addition, component numerals and/or numbers may be used repeatedly in several embodiments of the present disclosure. Such repeated use is for the purpose of simplicity and clarity, and it does not represent the relationship between different discussed embodiments and/or configurations.

Furthermore, for easy description, spatial relative terms such as "under", "below", "lower part", "above", "upper part", "lower part", "left side", "right side", etc. may be used in the present disclosure to describe the relationship between one component or feature and another component or feature as illustrated in the drawings. In addition to the orientations depicted in the drawings, the spatial relative terms are intended to cover different orientations of the devices in use or operation. The equipment may be oriented differently (e.g., rotated for 90 degrees or in other orientations), and the spatial relative description terms used herein may also be interpreted accordingly. It should be understood that when a component is referred to as being "connected to" or "coupled to" another component, it may be directly connected to or coupled to the another component, or there may be an intermediate component.

Although a numerical range and parameters used to define the broader scope of the present disclosure are approximate values, the relevant values in the specific embodiments have been presented as precisely as possible herein. However, any numerical value inherently and inevitably contains a standard deviation caused by individual testing methods. The term "approximately" herein generally refers to an actual value being within +10%, 5%, 1% or 0.5% of a specific value or range. Or, the term "approximately" indicates that the actual value falls within an acceptable standard error of an average value, depending on the considerations of a person of ordinary skill in the art. It shall be understood that, except in experimental examples or unless otherwise clearly specified, all ranges, quantities, values and percentages used herein are modified by "approximately". Therefore, unless otherwise specified, the numerical parameters disclosed in this specification and appended claims are all approximate values and may be changed as needed. At a minimum, these numerical parameters should be understood as to include the indicated significant digits and the values obtained by applying a conventional rounding method. The numerical range herein is expressed as spanning from one endpoint to another endpoint or between two endpoints. Unless otherwise specified, the value range herein includes endpoints.

FIG. 1 is a schematic diagram of a module of material handling equipment provided by some embodiments of the present disclosure.

As shown in FIG. 1, the material handling equipment 10 includes a controller 102, a display device 104 and a sensor 106. The controller 102 is operably coupled with the display device 104 and the sensor 106. The controller 102 may be matched with the display device 104 and the sensor 106 to realize a pose detection method provided by the present disclosure. The controller 102, the display device 104 and the sensor 106 may be disposed on the material handling equipment 10. The sensor 106 may be disposed on a fork of the material handling equipment 10. The sensor 106 may be disposed at a root portion of the fork of the material handling equipment 10. The sensor 106 may also be disposed on a door frame of the material handling equipment 10.

The controller 102 may include a memory 102*a* and a processor 102*b*. It needs to be noted that the controller 102 is not limited to be implemented in hardware, software or a combination of hardware and software. In some embodiments of the present disclosure, the controller 102 may be a plug-and-play device. In some embodiments of the present disclosure, the controller 102 may be connected with the material handling equipment 10 in a wired or wireless manner.

The memory 102*a* may be an integrated element. The memory 102*a* may be regarded as consisting of a plurality of storage units. Information, for example, but not limited to data information such as a point cloud and a pose of the material handling equipment 10 may be respectively stored in different storage units or stored in the same storage unit.

The processor 102*b* may be an integrated element. The processor 102*b* may be regarded as consisting of a plurality of processing units. The processor 102*b* may read required data information from the memory 102*a*. The processor 102*b* may store the data information into the memory 102*a*. The processor 102*b* may receive and process data input (for example, through touch control operation) by a user on the display device 104 or sensed by the sensor 106.

The display device 104 may be a touch control screen. The display device 104 may also be a non-touch control screen. In some embodiments of the present disclosure, the material handling equipment 10 may include no display device 104. The display device 104 may be disposed at a remote end of the material handling equipment 10, for example but not limited to a remote control room.

The sensor 106 may be an integrated element. The sensor 106 may consist of a plurality of sensing elements. The sensor 106 may be, but is not limited to a complementary metal oxide semiconductor sensor, a charge coupled device sensor, a Time-of-Flight (TOF) sensor or a lidar. The sensor 106 may send the collected information of a detection object to the controller 102. In some embodiments of the present disclosure, the material handling equipment 10 may include no sensor 106. The sensor 106 may be manually installed onto the material handling equipment 10 by a user before the use of the material handling equipment 10.

The material handling equipment 10 may be equipment capable of automatically or semi-automatically performing a handling task. The material handling equipment 10 includes the following common forms: a fork-lift truck, an Automated Guided Vehicle (AGV), an Autonomous Mobile Robot (AMR), a humanoid robot or a robotic arm, etc. In some embodiments of the present disclosure, the material handling equipment 10 may be an unmanned vehicle applied to a warehouse, for example, an automated guided forklift.

Figure 2:
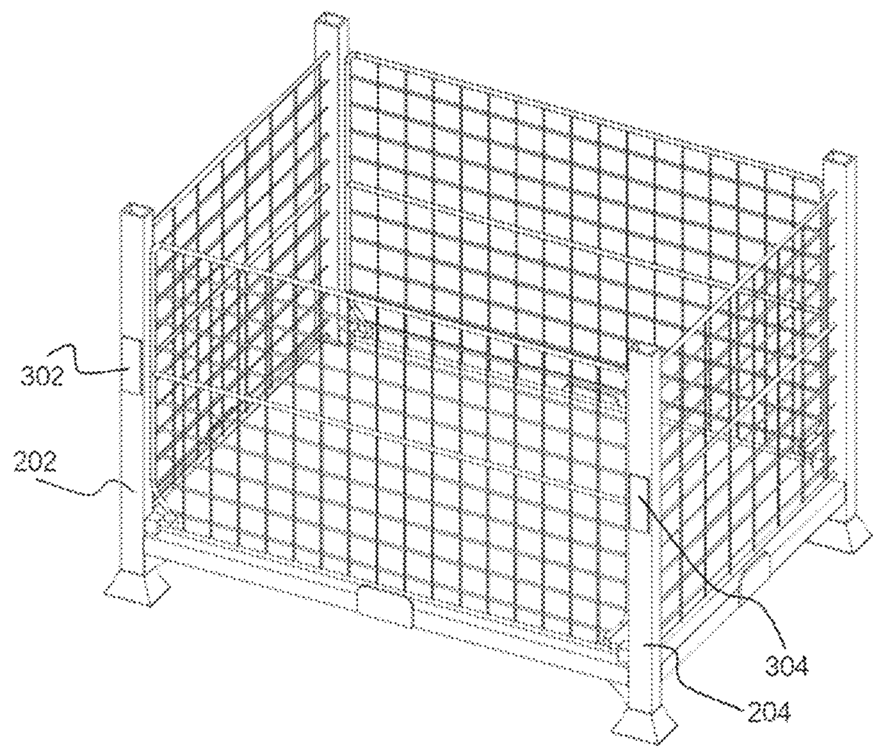
FIG. 2 is a schematic diagram of a detection object provided with reflective components provided by some embodiments of the present disclosure.

FIG. 2 is a schematic diagram of a detection object provided with reflective components provided by some embodiments of the present disclosure.

As shown in FIG. 2, a front side of the detection object 20 is provided with a left upright 202 and a right upright 204. A reflective component 302 is disposed on the left upright 202. A reflective component 304 is disposed on the right upright 204. The reflective component 302 and the reflective component 304 are symmetrically disposed on the detection object 20. As shown in FIG. 2, the reflective component 302 and the reflective component 304 are axisymmetric, and the reflective component 302 and the reflective component 304 have the same installation height.

The reflective component 302 and the reflective component 304 may also be arranged in other manners. In other embodiments of the present disclosure, the reflective component 302 and the reflective component 304 may be centrally symmetric, and the reflective component 302 and the reflective component 304 have a preset installation height difference.

The number of the reflective components may be not limited to 2. In some embodiments of the present disclosure, the reflective component may be a single reflective component. The single reflective component may be disposed on a surface of the detection object 20. The single reflective component may be disposed on a surface of the front side of the detection object 20. The single reflective component may be disposed in a center position of the surface of the front side of the detection object 20. In some embodiments of the present disclosure, the reflective components may include 3 or more reflective components. The 3 or more reflective components may be disposed on the same surface of the detection object 20. The three reflective components may be disposed on the surface of the front side of the detection object 20. In some embodiments of the present disclosure, when the reflective components are three, the two of the three reflective components may be respectively disposed on the left upright 202 and the right upright 204 of the detection object 20, and the other one reflective component of the three reflective components may be disposed on the surface of the front side of the detection object 20 between the left upright 202 and the right upright 204.

A surface, facing the outside, of the reflective component 302 is a plane. A surface, facing the outside, of the reflective component 304 is a plane. Although it is not directly shown in FIG. 2, the plane, facing the outside, of the reflective component 302 may be provided with a regular pattern. Although it is not directly shown in FIG. 2, the plane, facing the outside, of the reflective component 304 may be provided with a regular pattern. In some embodiments of the present disclosure, the plane, facing the outside, of the reflective component 302 is provided with a diamond-shaped pattern. In some embodiments of the present disclosure, the plane, facing the outside, of the reflective component 304 is provided with a diamond-shaped pattern. The reflective component with the diamond-shaped pattern may uniformly distribute light rays to the target region to avoid light spots with nonuniform brightness. In addition, the reflective component with the diamond-shaped pattern concentrate light propagation in a specified direction to form distinct beam directivity.

As shown in FIG. 2, each of the reflective component 302 and the reflective component 304 is in a rectangular shape. In some embodiments of the present disclosure, the reflective component 302 may be any regularly-shaped component. In some embodiments of the present disclosure, the reflective component 304 may be any regularly-shaped component. In some embodiments of the present disclosure, the reflective component 302 may be in a rectangular shape or a circular shape. In some embodiments of the present disclosure, the reflective component 304 may be in a rectangular shape or a circular shape. In a specific embodiment of the present disclosure, the reflective component 304 may be in a square shape, and the side lengths of the square shape, for example, may be 7 cm to 9 cm.

As shown in FIG. 2, the detection object 20 is a material cage. In some embodiments of the present disclosure, the detection object 20 may also be other types of cargo, such as a material box, a pallet box, an oil drum or a cardboard box.

Figure 3:
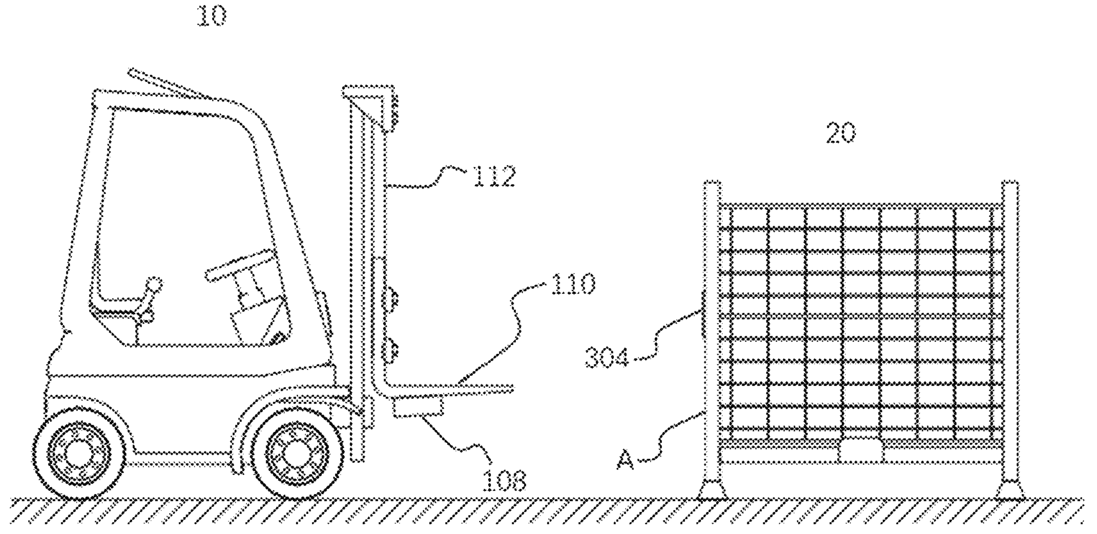
FIG. 3 is a schematic diagram of a scene when material handling equipment provided by some embodiments of the present disclosure faces a detection object provided with reflective components.

FIG. 3 is a schematic diagram of a scene when material handling equipment provided by some embodiments of the present disclosure faces a detection object provided with reflective components. The material handling equipment shown in FIG. 3 is an automated guided forklift. However, it should be understood that in other embodiments of the present disclosure, the material handling equipment may also take other forms.

As shown in FIG. 3, the material handling equipment 10 includes the fork 110 and the door frame 112.

A sensor 108 may be disposed on the material handling equipment 10, so that a view field of the sensor 108 can cover the entire region of the detection object 20. The sensor 108 may be disposed on the fork 110 or the door frame 112. In a specific embodiment of the present disclosure, as shown in FIG. 3, the sensor 108 is disposed at the root portion of the fork 110.

As shown in FIG. 3, the reflective component 304 is disposed on a surface A of the detection object 20, and the surface A is perpendicular to the ground. In some embodiments of the present disclosure, the surface A of the detection object 20 is provided with the reflective component 304, and an included angle may be formed between the surface A and the ground. The included angle defines an included angle between the surface of the reflective component 304 and the ground, so that the surface of the reflective component 304 can indicate whether the surface A of the detection object 20 is inclined towards the detection object 20 per se or inclined towards the outside.

Figure 4:
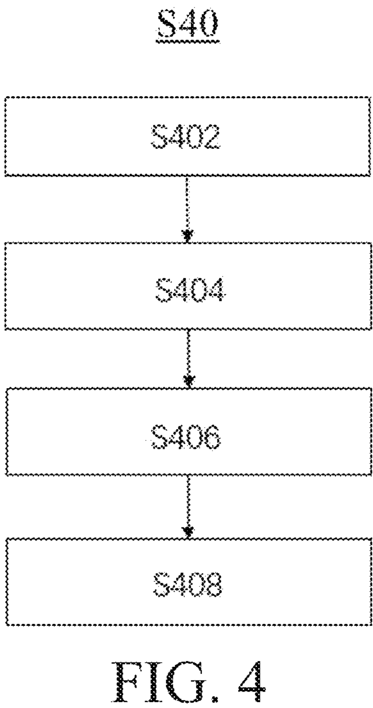
FIG. 4 is a schematic flowchart of a pose detection method provided by some embodiments of the present disclosure.

FIG. 4 is a schematic flowchart of a pose detection method provided by some embodiments of the present disclosure.

During the detection on the pose of the detection object 20 according to the pose detection method provided by some embodiments of the present disclosure, firstly, the material handling equipment 10 moves to a position in front of the detection object 20, so that the fork 110 of the material handling equipment 10 faces the detection object 20; then, the sensor 108 may collect information of the detection object 20; after the information of the detection object 20 is collected, the controller 104 may perform subsequent processing on the information and implement the corresponding actions, so that the pose of the detection object 20 is finally determined.

As shown in FIG. 4, a pose detection method S40 includes action S402, action S404, action S406, and action S408.

The pose detection method S40 is performed by a controller 104 coupled with a memory 102 and a sensor 108. Specifically, a program instruction stored in the memory 102 is configured to cause material handling equipment 10 to perform the pose detection method S40 through the controller 104.

In action S402, a point cloud of a detection object 20 provided with a reflective component is acquired. A point cloud of the detection object 20 provided with the reflective component may be acquired through the sensor 108. When the material handling equipment 10 moves to a position in front of the detection object 20, the sensor 108 may collect the point cloud of the detection object 20 provided with the reflective component.

In some embodiments of the present disclosure, the pose detection method S40 further include preprocessing the acquired point cloud. Specifically, the preprocessing includes performing voxel downsampling and Region of Interest (ROI) clipping on the collected point cloud. Through the voxel downsampling, a data volume of the point cloud can be reduced, the processing efficiency can be improved, and at the same time, main information of the point cloud can be remained. In some embodiments of the present disclosure, the voxel downsampling may include: calculating the minimum/maximum coordinate of the point cloud in a three-dimensional space to build voxel grids; allocating points in the point cloud into corresponding voxel grids; determining a representative point of the voxel grid; and substituting all points in the voxel grid by the representative point of the voxel grid. The representative point may be any one point in the voxel grid. The representative point may be the centroid in the voxel grid, a point farthest from the voxel center in the voxel grid, or an extreme point on a specified coordinate axis (X/Y/Z) in the voxel grid. For ROI clipping, an invalid point cloud can be filtered through selecting an ROI, thereby reducing the data processing volume of the point cloud data. In some embodiments of the present disclosure, the ROI clipping may include: determining a target and a range of the ROI; defining a mathematical parameter of the ROI; and performing ROI clipping.

Figure 5:
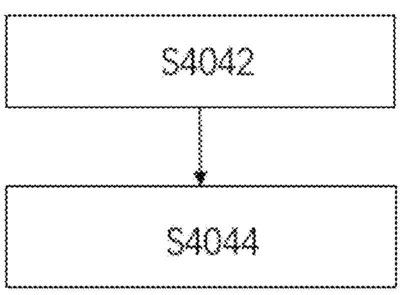
FIG. 5 is a schematic diagram of a specific flow process for extracting a point cloud of a detection object.

In action S404, the point cloud of the detection object is extracted to acquire the point cloud corresponding to the reflective component. When the sensor 108 is a lidar, after pulse laser of the lidar is emitted onto the reflective component, the point cloud with intensity information is returned. Action S404 aims at extracting the point cloud corresponding to the reflective component from the point cloud of the detection object 20 provided with the reflective component according to the intensity information of the point cloud of the detection object. FIG. 5 is a schematic diagram of a specific flow process for extracting a point cloud of a detection object. As shown in FIG. 5, action S404 includes action S4042 and action S4044. In action S4042, an intensity value of the point cloud of the detection object 20 is compared with a first threshold. In action S4044, when intensity values of the points in the point cloud of the detection object 20 are greater than the first threshold, the points are identified as the points in the point cloud corresponding to the reflective component. In some embodiments of the present disclosure, the first threshold may be 190 to 210. In some other embodiments of the present disclosure, the first threshold may be other values or in another value range.

Figure 6:
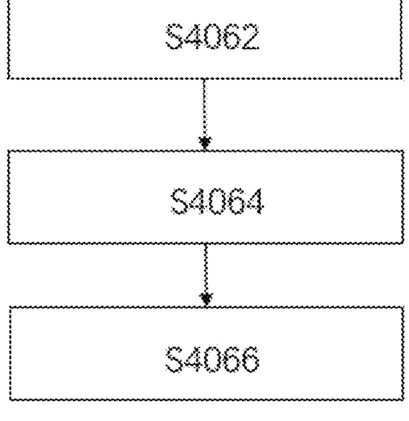
FIG. 6 is a schematic diagram of a specific flow process for determining a target plane region according to a point cloud corresponding to a reflective component.

In action S406, a target plane region is determined according to the point cloud corresponding to the reflective component. FIG. 6 is a schematic diagram of a specific flow process for determining a target plane region according to a point cloud corresponding to a reflective component. As shown in FIG. 6, action S406 includes action S4062, action S4064 and action S4066.

In action S4062, the point cloud corresponding to the reflective component is clustered to acquire a clustered point cloud cluster. In this case, the acquired clustered point cloud cluster not only includes a point cloud cluster of the reflective component per se, and may further include a point cloud cluster of an object with the intensity information similar to that of the reflective component.

Figure 7:
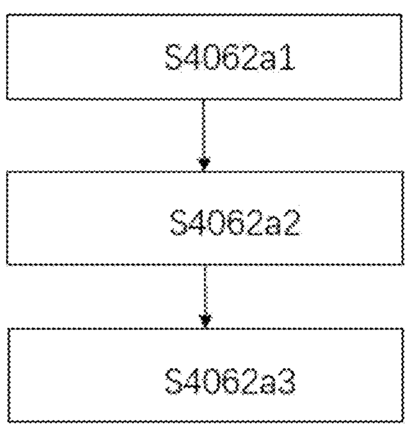
FIG. 7 is a schematic diagram of a specific flow process for clustering a point cloud corresponding to a reflective component to acquire a clustered point cloud cluster according to some embodiments of the present disclosure.

FIG. 7 is a schematic diagram of a specific flow process for clustering a point cloud corresponding to a reflective component to acquire a clustered point cloud cluster according to some embodiments of the present disclosure. As shown in FIG. 7, action S4062 includes action **S4062*a*1, action S4062*a*2 and action S4062*a*3. In action S4062*a*1, a point in the point cloud corresponding to the reflective component is selected as a search point, and the search point is added into a first set. In action S4062*a*2, a point having a distance from the search point being smaller than a second threshold is acquired, the point is added into the first set, and the point in the first set is used as the search point to repeat such an action. The second threshold may be 2 cm to 4 cm. In a specific embodiment of the present disclosure, the second threshold may be 3 cm. In some other embodiments of the present disclosure, the second threshold may be other values or in another value range. A point having a distance from the search point being smaller than the second threshold may be a point closest to the search point, and may also be a point in a radius range of the search point. In action S4062*a*3, the clustered point cloud cluster is determined according to the point in the first set. Through the method actions as shown in FIG. 7**, the point cloud which does not belong to the reflective component and has the intensity information similar to that of the reflective component may be excluded.

Figure 8:
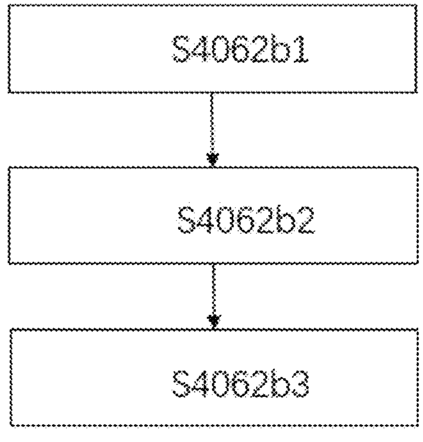
FIG. 8 is a schematic diagram of a specific flow process for clustering a point cloud corresponding to a reflective component to acquire a clustered point cloud cluster according to some other embodiments of the present disclosure.

FIG. 8 is a schematic diagram of a specific flow process for clustering a point cloud corresponding to a reflective component to acquire a clustered point cloud cluster according to some other embodiments of the present disclosure. As shown in FIG. 8, action S4062 includes action **S4062*b*1, action S4062*b*2 and action S4062*b*3. In action S4062*b*1, a point in the point cloud corresponding to the reflective component is selected as a search point, and the search point is added into a second set. In action S4062*b*2, when an included angle between a normal vector of the search point and a normal vector of an adjacent point is smaller than a third threshold, the adjacent point is added into the second set, and the adjacent point in the second set is used as the search point to repeat such an action. In action S4062*b*3, the clustered point cloud cluster is determined according to the point in the second set. The reflective component is disposed on the surface A of the detection object 20, so an included angle between normal vectors of all adjacent points in the point cloud of the reflective component shall be smaller than the third threshold. The third threshold may be 0.2° to 0.4°. In some other embodiments of the present disclosure, the third threshold may be other values or in another value range. Through the method actions as shown in FIG. 8**, the point cloud which does not belong to the reflective component and has the intensity information similar to that of the reflective component may be further excluded.

Figure 9:
FIG. 9 is a schematic diagram of a specific flow process for clustering a point cloud corresponding to a reflective component to acquire a clustered point cloud cluster according to some other embodiments of the present disclosure.
Figure 9:
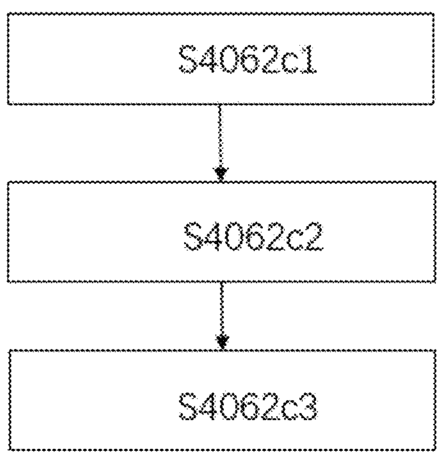

FIG. 9 is a schematic diagram of a specific flow process for clustering a point cloud corresponding to a reflective component to acquire a clustered point cloud cluster according to some other embodiments of the present disclosure. When the material handling equipment 10 is an automated guided forklift, as shown in FIG. 9, action S4062 includes action **S4062*c*1, action S4062*c*2 and action S4062*c*3. When the pose of the detection object 20 is detected by using the automated guided forklift, the automated guided forklift moves to the position of the detection object 20, and the fork of the automated guided forklift faces the detection object 20. In action S4062*c*1, a point in the point cloud corresponding to the reflective component is selected as a search point. In action S4062*c*2, when an included angle between a normal vector of the search point and a fork insertion direction of the fork of the automated guided forklift is smaller than a fourth threshold, the search point is added into a third set. In action S4062*c*3, the clustered point cloud cluster is determined according to the point in the third set. The fourth threshold may be 20° to 30°. In a specific embodiment of the present disclosure, the fourth threshold may be 30°. In some other embodiments of the present disclosure, the fourth threshold may be other values. Through the method actions as shown in FIG. 9**, the point cloud which does not belong to the reflective component and has the intensity information similar to that of the reflective component may be further excluded.

The actions in FIG. 7 to FIG. 9 may be performed alone, and may be performed in combination. In some embodiments of the present disclosure, the actions in FIG. 7 and FIG. 8 may be performed in combination. In some embodiments of the present disclosure, the actions in FIG. 7 and FIG. 9 may be performed in combination. In some embodiments of the present disclosure, the actions in FIG. 8 and FIG. 9 may be performed in combination. In some embodiments of the present disclosure, the actions in FIG. 7, FIG. 8 and FIG. 9 may be performed in combination.

When the actions in FIG. 7 and FIG. 8 are performed in combination, firstly, a point in the point cloud corresponding to the reflective component is selected as a search point, and the search point is added into the set; then, a point having a distance from the search point being smaller than a second threshold and having an included angle between a normal vector of the point and a normal vector of the search point being smaller than a third threshold is acquired, and is used as a search point to repeat such an action; and finally, a clustered point cloud cluster is determined according to the point in the set.

When the actions in FIG. 7 and FIG. 9 are performed in combination, firstly, a point in the point cloud corresponding to the reflective component is selected as a search point, and when an included angle between a normal vector of the search point and a fork insertion direction of the fork of the automated guided forklift is smaller than a fourth threshold, the search point is added into the set; then, a point having a distance from the search point being smaller than a second threshold is acquired, the point is added into the set, and the point in the set is used as a search point to repeat such an action; and finally, a clustered point cloud cluster is determined according to the point in the set.

When the actions in FIG. 8 and FIG. 9 are performed in combination, firstly, a point in the point cloud corresponding to the reflective component is selected as a search point, and when an included angle between a normal vector of the search point and a fork insertion direction of the fork of the automated guided forklift is smaller than a fourth threshold, the search point is added into the set; then, when an included angle between a normal vector of the search point and a normal vector of an adjacent point is smaller than a third threshold, the adjacent point is added into the set, and the adjacent point in the set is used as a search point to repeat such an action; and finally, a clustered point cloud cluster is determined according to the point in the set.

When the actions in FIG. 7, FIG. 8 and FIG. 9 are performed in combination, firstly, a point in the point cloud corresponding to the reflective component is selected as a search point, and when an included angle between a normal vector of the search point and a fork insertion direction of the fork of the automated guided forklift is smaller than a fourth threshold, the search point is added into the set; then, a point having a distance from the search point being smaller than a second threshold and having an included angle between a normal vector of the point and a normal vector of the search point being smaller than a third threshold is acquired, and the point is used as a search point to repeat such an action; and finally, a clustered point cloud cluster is determined according to the point in the set.

In some embodiments of the present disclosure, after the clustered point cloud cluster is acquired, action S406 may further include: the number of points in the clustered point cloud cluster is calculated; when the number of points in the clustered point cloud cluster is smaller than a fifth threshold, the clustered point cloud cluster is determined not to be the point cloud corresponding to the reflective component; and when the number of points in the clustered point cloud cluster is greater than the fifth threshold, the clustered point cloud cluster is determined to be the point cloud corresponding to the reflective component. The fifth threshold may be 5,000 to 8,000. In some other embodiments of the present disclosure, the fifth threshold may be other values or in another value range.

In action S4064, plane fitting is performed on the clustered point cloud cluster to acquire a point cloud plane region.

Figure 10:
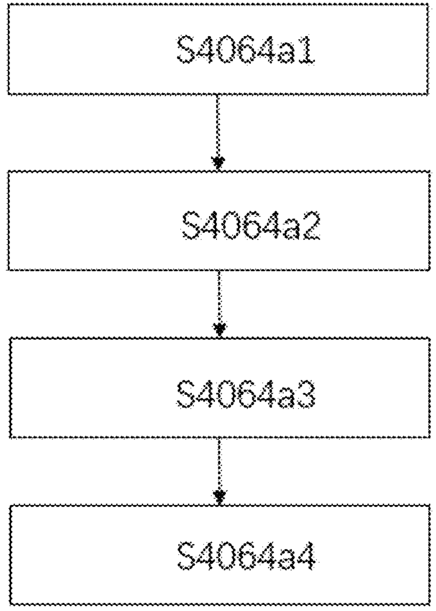
FIG. 10 is a schematic diagram of a specific flow process for performing plane fitting on a clustered point cloud cluster to acquire a point cloud plane region according to some embodiments of the present disclosure.

FIG. 10 is a schematic diagram of a specific flow process for performing plane fitting on a clustered point cloud cluster to acquire a point cloud plane region according to some embodiments of the present disclosure. As shown in FIG. 10, action S4064 includes action **S4064*a*1, action S4064*a*2, action S4064*a*3, and action S4064*a*4**.

In action **S4064*a*1**, three points are randomly selected from one or more clustered point cloud clusters, parameters A, B, C and d of a plane equation Ax+By+Cz+d=0 corresponding to the three points are calculated according to the three-dimensional coordinate values of the three points, and a distance between two of the three points is greater than the maximum external dimension of the reflective component. The maximum external dimension refers to the maximum linear dimension of the reflective component. For a rectangular reflective component, the maximum external dimension is a diagonal line dimension. For a circular reflective component, the maximum external dimension is a diameter.

In action **S4064*a*2**, if a distance from remaining points in the one or more clustered point cloud clusters to the plane equation is smaller than a sixth threshold, the points are identified as inliers of the plane equation, and the total number of the inliers is counted. The sixth threshold may be 10 to 30. In a specific embodiment of the present disclosure, the sixth threshold may be 30. In some other embodiments of the present disclosure, the sixth threshold may be other values or in another value range.

In action **S4064*a*3, action S4064*a*1 and action S4064*a*2** are repeated, and the parameters of the plane equation are updated if the currently calculated number of inliers of the plane equation is greater than the total number of the counted inliers.

In action **S4064*a*4, action S4064*a*1, action S4064*a*2 and action S4064*a*3 are repeated until the plane equation with the maximum number of the inliers is found. In some embodiments of the present disclosure, action S4064*a*4 may further include: action S4064*a*1, action S4064*a*2, and action S4064*a*3** are repeated, and iteration is continuously performed until an iteration threshold is reached, so that the plane equation with the maximum number of the inliers is found. In some embodiments of the present disclosure, the iteration threshold may be estimated according to the following formula: supposed that the proportion of the inliers in the clustered point cloud cluster is p, $$p = \frac{n_{inliers}}{n_{inliers} + n_{outliers}}.$$

In the formula, $n_{inliers}$ is the number of the inliers, and $n_{outliers}$ is the number of outliers. The probability that at least one of the selected points is an outlier (i.e., the sampling failure probability) is: $1-p^K$. The probability that at least one sampling is successful in M samplings is: $z=1-(1-p^K)^M$. Then the iteration threshold meets $$m = \frac{\log(1-z)}{\log(1-pK)}.$$

In the formula, K is the number of iterations. According to the plane equation, the point cloud plane region corresponding to the one or more clustered point cloud clusters may be determined.

In some embodiments of the present disclosure, before action **S4064*a*2, action S4064 may further include performing action S4064*a*1 again when an included angle between the plane of the front side of the material handling equipment 10** and the plane corresponding to the plane equation is greater than a seventh threshold. The seventh threshold may be 20° to 30°. In a specific embodiment of the present disclosure, the seventh threshold may be 30°. In some other embodiments of the present disclosure, the seventh threshold may be other values or in another value range.

In some embodiments of the present disclosure, action S4064 may further include calculating a linear equation according to the inliers of the plane equation, and determining the parameters of the plane equation according to parameters of the linear equation and a preset inclination angle. The preset inclination angle is an included angle between the surface of the reflective component and a normal vector perpendicular to the ground. In some embodiments of the present disclosure, the preset inclination angle is 0°. When the preset inclination angle is 0°, it indicates that the surface of the detection object 20 provided with the reflective component is perpendicular to the ground. In some other embodiments of the present disclosure, the preset inclination angle is not 0°. When the preset inclination angle is not 0°, it indicates that the surface of the detection object 20 provided with the reflective component is not perpendicular to the ground. In this case, the surface of the detection object 20 provided with the reflective component may be inclined towards the detection object 20 per se or may be inclined towards the outside.

In action S4066, a target plane region is determined from the point cloud plane region according to the parameters of the reflective component. Action S4066 includes determining the point cloud plane region to be the target plane region when the parameters of the point cloud plane region conform to a corresponding parameter range of the parameters of the reflective component. In some embodiments of the present disclosure, the parameters of the reflective component are one or more of the following parameters: the number of the reflective components, the dimension of one or a plurality of the reflective components, the spacing between the plurality of reflective components, the height difference between the plurality of reflective components, and the shape of one or the plurality of reflective components. For example, when the reflective component is in a rectangular shape of 8 cm*8 cm, the length and the width of the point cloud plane region may be calculated according to the clustered point cloud cluster corresponding to the point cloud plane region; the length and the width are compared to the actual length and the actual width of the reflective component (i.e., 8 cm*8 cm); and when the length and the width of the point cloud plane region are within corresponding parameter ranges of the actual length and width of the reflective component (for example, but not limited to: (7 cm to 10 cm)*(7 cm to 10 cm)), the point cloud plane region may be determined to be the target plane region. The spacing between the plurality of reflective components, for example, may be the spacing between two reflective components, and for example, may be the spacing between every two reflective components in the three reflective components. The height difference between the plurality of reflective components, for example, may be the height difference between two reflective components, and for example, may be the height difference between every two reflective components in the three reflective components.

In action S408, a pose of the detection object is determined according to a pose of the target plane region.

Figure 11:
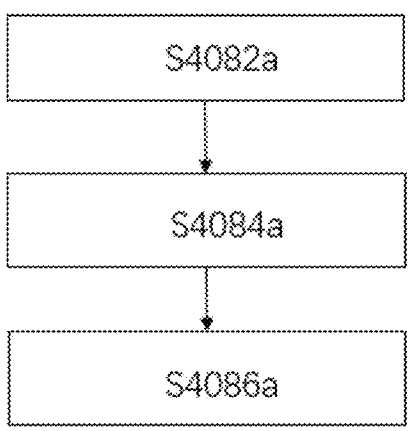
FIG. 11 is a schematic diagram of a specific flow process for determining a pose of the detection object according to a pose of a target plane region according to some embodiments of the present disclosure.

FIG. 11 is a schematic diagram of a specific flow process for determining a pose of the detection object according to a pose of a target plane region according to some embodiments of the present disclosure. FIG. 11 shows how to determine the pose of the detection object according to the pose of the target plane region when the number of the reflective component is only one.

As shown in FIG. 11, action S408 includes action S4082*a*, action S4084*a* and action S4086*a*.

The action S4082*a*, action S4084*a* and action S4086*a* are specifically illustrated in combination with FIG. 3 below. In FIG. 3, the surface A of the detection object 20 provided with the reflective component 304 is perpendicular to the ground.

In action S4082*a*, a representative point of the point cloud cluster corresponding to the target plane region is calculated to determine a three-dimensional coordinate value of the detection object. After the representative point of the point cloud cluster corresponding to the target plane region is calculated, the three-dimensional coordinate value of the representative point may be directly used as a three-dimensional coordinate value of the detection object. The representative point may be any one point of the point cloud cluster corresponding to the target plane region. The representative point may be one of a geometric center point, a centroid point, a center of gravity point or a lower edge center point of the point cloud cluster corresponding to the target plane region.

In action S4084*a*, a yaw angle of the detection object is determined according to the target plane region. The yaw angle indicates whether the material handling equipment is directly facing the detection object or not. When the material handling equipment is directly facing the detection object, the yaw angle is zero. When the material handling equipment is directly facing the detection object, the yaw angle is not zero.

In action S4086*a*, the pose of the detection object is determined according to the three-dimensional coordinate value and the yaw angle of the detection object. The surface A of the detection object 20 provided with the reflective component 304 as shown in FIG. 3 is perpendicular to the ground, so both a pitch angle and a roll angle of the detection object are zero. Therefore, in action S4086*a*, the pose of the detection object may be determined according to the three-dimensional coordinate value and the yaw angle of the detection object.

Figure 12:
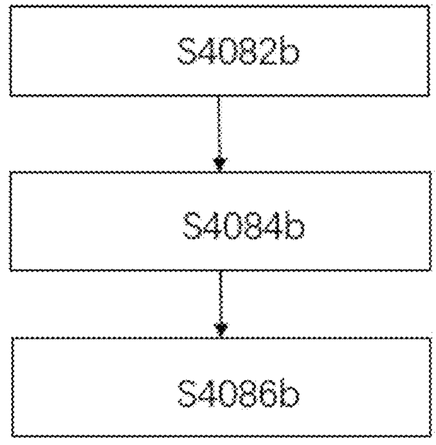
FIG. 12 is a schematic diagram of a specific flow process for determining a pose of the detection object according to a pose of a target plane region according to some other embodiments of the present disclosure.

FIG. 12 is a schematic diagram of a specific flow process for determining a pose of the detection object according to a pose of a target plane region according to some other embodiments of the present disclosure. FIG. 12 shows how to determine the pose of the detection object according to the pose of the target plane region when the number of the reflective components is two.

As shown in FIG. 12, action S408 includes action S4082*b*, action S4084*b*, action S4086*b*, and action S4088.

The action S4082*b*, action S4084*b*, action S4086*b* and action S4088 are specifically illustrated in combination with FIG. 3 below. In FIG. 3, the surface A of the detection object 20 provided with the reflective component 304 is perpendicular to the ground.

In action S4082*b*, a representative point of the point cloud cluster corresponding to the target plane region of the first reflective component and a representative point of the point cloud cluster corresponding to the target plane region of the second reflective component are respectively calculated. After the representative point of the point cloud cluster corresponding to the target plane region is calculated, the three-dimensional coordinate value of the representative point may be directly used as a three-dimensional coordinate value of the detection object. The representative point may be any one point of the point cloud cluster corresponding to the target plane region. The representative point may be one of a geometric center point, a centroid point, a center of gravity point or a lower edge center point of the point cloud cluster corresponding to the target plane region. When the representative point is the geometric center point, the representative point may be calculated by the following: the point cloud cluster corresponding to the target plane region of the reflective component is divided into a plurality of layers at a first interval in a height direction perpendicular to the ground; the center point of each layer of the plurality of layers is calculated to acquire a plurality of center points; and for the first reflective component, a center point of the plurality of center points is calculated as the representative point; and for the second reflective component, a center point of the plurality of center points is calculated as the representative point.

In action S4084*b*, a three-dimensional coordinate value of the detection object is determined according to the center point between the representative point of the point cloud cluster corresponding to the target plane region of the first reflective component and the representative point of the point cloud cluster corresponding to the target plane region of the second reflective component.

In action S4086*b*, a yaw angle of the detection object is determined according to the target plane region corresponding to the first reflective component and the target plane region corresponding to the second reflective component. The yaw angle indicates whether the material handling equipment is directly facing the detection object or not. When the material handling equipment is directly facing the detection object, the yaw angle is zero. When the material handling equipment is directly facing the detection object, the yaw angle is not zero.

In action S4088, the pose of the detection object is determined according to the three-dimensional coordinate value and the yaw angle of the detection object. The surface A of the detection object 20 provided with the reflective component 304 as shown in FIG. 3 is perpendicular to the ground, so both a pitch angle and a roll angle of the detection object are zero. Therefore, in action S4088, the pose of the detection object may be determined according to the three-dimensional coordinate value and the yaw angle of the detection object.

FIG. 11 and FIG. 12 respectively show how to determine the pose of the detection object according to the pose of the target plane region when the number of the reflective component(s) is one or two. However, it should be understood that when the number of the reflective components is at least three, the pose of the detection object may also be determined by using a method similar to that as shown in FIG. 11 and FIG. 12, and it is not repeated herein.

In some embodiments of the present disclosure, an included angle may also be formed between the ground and the surface A of the detection object 20 provided with the reflective component 304. The included angle may indicate whether the surface A of the detection object 20 provided with the reflective component 304 is inclined towards the detection object 20 per se or inclined towards the outside. That is, the pitch angle and the roll angle of the detection object are not zero. In this case, the pose of the detection object may be determined according to the three-dimensional coordinate value, the yaw angle, the pitch angle and the roll angle of the detection object.

The pose detection method S40 may further include outputting the pose of the detection object to the material handling equipment after extrinsic parameter transformation. When the point cloud of the detection object provided with the reflective component is acquired by the sensor, and the pose of the detection object is the pose of the detection object in the coordinate system of the sensor, the pose of the detection object in the sensor coordinate needs to be transformed to the pose of the detection object in the coordinate system of the material handling equipment through coordinate transformation. The material handling equipment may handle the detection object according to the pose of the detection object in the coordinate system of the material handling equipment. Coordinate transformation may be performed in various manners. In some embodiment of the present disclosure, the coordinate transformation may include: a relative position (displacement distance) and relative pose (rotation angle) between a coordinate origin of the coordinate system of the sensor and a coordinate origin of the coordinate system of the material handling equipment are acquired through extrinsic parameter calibration; according to the relative rotation relationship between the coordinate systems of the sensor and the material handling equipment, the pose of the detection object in the coordinate system of the sensor is "rotated" to the coordinate system of the material handling equipment, so that the poses of the two are identical; and according to the relative position (displacement distance) between the coordinate origin of the coordinate system of the sensor and the coordinate origin of the coordinate system of the material handling equipment, the coordinate position of the detection object in the coordinate system of the sensor is transformed to the position in the coordinate system of the material handling equipment, and the position of the detection object in the coordinate system of the material handling equipment is acquired.

In some embodiments, the detection object is cargo. Through the pose detection method shown in FIG. 4, the detection of the material handling equipment on the pose of the handled cargo is more precise and accurate, the cargo can be precisely picked in the cargo handling process, and the precise picking of the cargo is favorable for the stable and reliable motion of the cargo after the picking. Or, in some embodiments, the detection object is a storage location structure such as a rack. Through the pose detection method shown in FIG. 4, the material handling equipment can precisely recognize the rack and a storage location on the rack, and it is favorable for the precise warehouse entering of the cargo. Or, in some embodiments, the detection object is an obstacle needing to be avoided. Through the pose detection method shown in FIG. 4, the material handling equipment can precisely recognize the obstacle needing to be avoided, and it is favorable for the safe handling of the material handling equipment.

Figure 13:
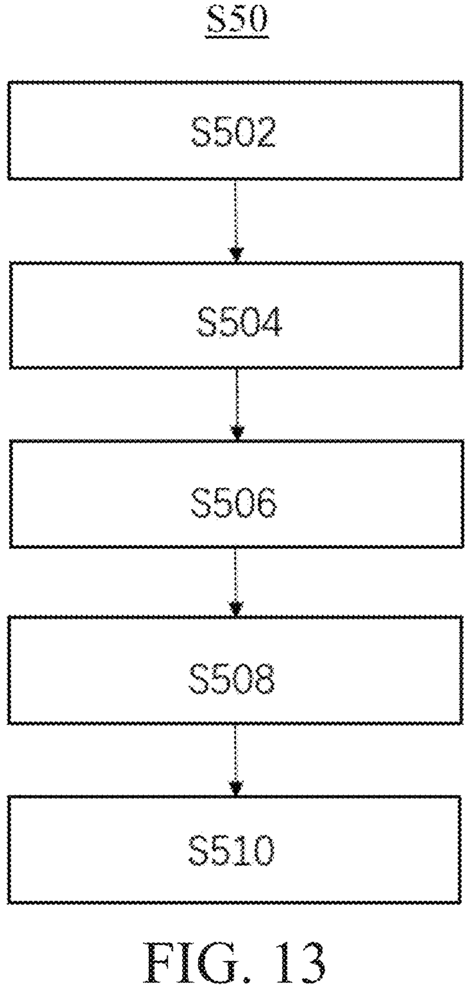
FIG. 13 is a schematic diagram of a specific flow process for performing a moving task of material handling equipment according to a pose of a detection object according to some embodiments of the present disclosure.

FIG. 13 is a schematic diagram of a specific flow process for performing a moving task of material handling equipment according to a pose of a detection object according to some embodiments of the present disclosure. As shown in FIG. 13, action S50 includes action S502, action S504, action S506, action S508 and action S510. In action S502, a point cloud of a detection object 20 provided with a reflective component is acquired. In action S504, the point cloud of the detection object is extracted to acquire the point cloud corresponding to the reflective component. In action S506, a target plane region is determined according to the point cloud corresponding to the reflective component. In action S508, a pose of the detection object is determined according to a pose of the target plane region. In action S510, a moving task of the material handling equipment is performed according to the pose of the detection object. The action S502, action S504, action S506 and action S508 are respectively the same as the action S402, action S404, action S406 and action S408 as shown in FIG. 4, and they are not repeated herein. That is, in some embodiments, according to the pose detection method as shown in FIG. 4, after the pose of the detection object is determined, the material handling equipment may also be controlled to perform the moving task according to the pose of the detection object. For example, the material handling equipment is controlled to avoid the detection object in a running path, or the fork or a clamp of the material handling equipment is controlled to take out and handle the detection object, or the material handling equipment is controlled to align the detection object to take and place the cargo. Therefore, the material handling equipment is safer and more reliable in the cargo handling process, and it is favorable for the safe handling by the material handling equipment.

In some embodiments of the present disclosure, the pose of the detection object in the coordinate system of the material handling equipment may be directly acquired through the pose detection method S40. In this case, the material handling equipment may directly handle the detection object according to the pose of the detection object without the need of coordinate transformation.

The material handling equipment, the controller and the pose detection method provided by some embodiments of the present disclosure have the following advantages: (1) through the arrangement of the reflective component, the pose of the detection object can be fast and accurately determined; (2) by clustering the point cloud, the point cloud data processing speed is higher, and the real time performance is higher; (3) the point cloud is extracted through the reflection intensity, and most objects that are obvious not reflective components can be fast excluded; and (4) the pose of the detection object can be determined by just disposing the reflective component on the detection object. This manner has the advantages of simple arrangement and easy operation, and avoids the influence of the shape and the dimension of the detection object.

It should be noted that throughout this specification, the reference to "some embodiments of the present disclosure" or similar terms means that the specific features, structures or characteristics described together with other embodiments are included in at least one embodiment and may not necessarily be presented in all embodiments. Therefore, the phrase "some embodiments of the present disclosure" or similar terms appearing throughout this specification does not necessarily refer to the same embodiment. In addition, the specific features, structures or characteristics of any specific embodiment may be combined with one or more other embodiments in any appropriate manner.

The technical content and features of the present invention have been disclosed as above. However, those skilled in the art may still make various substitutions and modifications based on the teaching and disclosure of the present invention without departing from the spirit of the present invention. Therefore, the protection scope of the present invention should not be limited to the contents disclosed by the embodiments, but shall encompass various substitutions and modifications that do not deviate from the present invention and are covered by the claims of the present disclosure.

We claim:

1. A material handling equipment, comprising at least one processor and at least one memory including instructions, the at least one memory and the instructions configured to, with the at least one processor, cause the material handling equipment at least to perform:

acquiring a point cloud of a detection object provided with one or more reflective components, wherein the one or more reflective components comprise a first reflective component and a second reflective component;

extracting, from the point cloud of the detection object, point clouds corresponding to the one or more reflective components;

determining a target plane region according to the point clouds corresponding to the one or more reflective components; and determining a pose of the detection object according to a pose of the target plane region, wherein the determining a pose of the detection object according to a pose of the target plane region comprises:

respectively calculating a third representative point of the point cloud cluster corresponding to the target plane region of the first reflective component and a fourth representative point of the point cloud cluster corresponding to the target plane region of the second reflective component;

determining a three-dimensional coordinate value of the detection object according to a center point between the third representative point and the fourth representative point;

determining a yaw angle of the detection object according to the target plane region corresponding to the first reflective component and the target plane region corresponding to the second reflective component; and determining the pose of the detection object according to the three-dimensional coordinate value and the yaw angle of the detection object.

2. The material handling equipment according to claim 1, wherein the first reflective component and the second reflective component are symmetrically disposed on the detection object.

3. The material handling equipment according to claim 2, wherein:

the first reflective component and the second reflective component are axisymmetric, and the first reflective component and the second reflective component have the same installation height; or the first reflective component and the second reflective component are centrally symmetric, and the first reflective component and the second reflective component have a preset installation height difference.

4. The material handling equipment according to claim 1, wherein a surface, facing the outside, of the one or more reflective component is a plane, the one or more reflective components are disposed on the same plane of the detection object, and the planes, facing the outside, of the one or more reflective components are provided with diamond-shaped patterns.

5. The material handling equipment according to claim 1, further comprising:

calculating a minimum/maximum coordinate of the point cloud of the detection object in a three-dimensional space to build voxel grids;

allocating points in the point cloud of the detection object into corresponding voxel grids;

determining a first representative point of the voxel grid; and substituting all points in the voxel grid by the first representative point of the voxel grid.

6. The material handling equipment according to claim 1, wherein the determining a target plane region according to the point clouds corresponding to the one or more reflective components comprises:

clustering the point clouds corresponding to the one or more reflective components to acquire a clustered point cloud cluster;

performing plane fitting on the clustered point cloud cluster to acquire a point cloud plane region; and determining the target plane region from the point cloud plane region according to parameters of the one or more reflective components.

7. The material handling equipment according to claim 6, wherein the clustering the point clouds corresponding to the one or more reflective components to acquire a clustered point cloud cluster comprises:

selecting a point in the point clouds corresponding to the one or more reflective components as a search point, and adding the search point into a first set;

acquiring a point having a distance from the search point being smaller than a second threshold, adding the point into the first set, and using the point in the first set as the search point to repeat such an action; and determining the clustered point cloud cluster according to the point in the first set.

8. The material handling equipment according to claim 6, wherein the clustering the point clouds corresponding to the one or more reflective components to acquire a clustered point cloud cluster comprises:

selecting a point in the point clouds corresponding to the one or more reflective components as a search point, and adding the search point into a second set;

when an included angle between a normal vector of the search point and a normal vector of an adjacent point is smaller than a third threshold, adding the adjacent point into the second set, and using the adjacent point in the second set as the search point to repeat such an action; and determining the clustered point cloud cluster according to the point in the second set.

9. The material handling equipment according to claim 6, wherein the material handling equipment is an automated guided forklift, and the actions further comprise:

selecting a point in the point clouds corresponding to the one or more reflective components as a search point;

when an included angle between a normal vector of the search point and a fork insertion direction of a fork of the automated guided forklift is smaller than a fourth threshold, adding the search point into a third set; and determining the clustered point cloud cluster according to the point in the third set.

10. The material handling equipment according to claim 6, wherein the actions further comprise:

when the number of the points in the clustered point cloud cluster is smaller than a fifth threshold, determining the clustered point cloud cluster not to be the point clouds corresponding to the one or more reflective components; and/or when the number of the points in the clustered point cloud cluster is greater than the fifth threshold, determining the clustered point cloud cluster to be the point clouds corresponding to the one or more reflective components.

11. The material handling equipment according to claim 6, wherein the performing plane fitting on the clustered point cloud cluster to acquire a point cloud plane region comprises:

(a) randomly selecting three points from one or more clustered point cloud clusters, calculating parameters of a plane equation, wherein a distance between two of the three points is greater than the maximum external dimension of the one or more reflective components;

(b) if a distance from remaining points in the clustered point cloud cluster to the plane equation is smaller than a sixth threshold, identifying the points as inliers of the plane equation, and counting a total number of the inliers;

(c) repeating action (a) and action (b), and updating the parameters of the plane equation if the currently calculated number of inliers of the plane equation is greater than the total number of the counted inliers; and (d) repeating action (a) to action (c) until the plane equation with the maximum number of the inliers is found.

12. The material handling equipment according to claim 11, wherein the performing plane fitting on the clustered point cloud cluster to acquire a point cloud plane region further comprises:

before action (b), when an included angle between a front plane of the material handling equipment and a plane corresponding to the plane equation is greater than a seventh threshold, implementing action (a) again.

13. The material handling equipment according to claim 11, wherein the performing plane fitting on the clustered point cloud cluster to acquire a point cloud plane region further comprises:

(e) calculating a linear equation according to the inliers of the plane equation, and determining the parameters of the plane equation according to parameters of the linear equation and a preset inclination angle; and the preset inclination angle is an included angle between the surface of the one or more reflective component and a normal vector perpendicular to the ground.

14. The material handling equipment according to claim 6, wherein the determining the target plane region from the point cloud plane region according to parameters of the one or more reflective components comprises:

when the parameters of the point cloud plane region conform to a corresponding parameter range of the parameters of the one or more reflective components, determining the point cloud plane region to be the target plane region; and the parameters of the one or more reflective components are one or more of the following parameters: the number of the one or more reflective components, the dimension of the one or more reflective components, the spacing of a plurality of reflective components, the height difference between the plurality of reflective components, or the shape of the one or more reflective components.

15. The material handling equipment according to claim 1, wherein the determining a pose of the detection object according to a pose of the target plane region comprises:

when the one or more reflective components comprise a single reflective component, calculating a second representative point of a point cloud cluster corresponding to the target plane region to determine a three-dimensional coordinate value of the detection object;

determining a yaw angle of the detection object according to the target plane region; and determining the pose of the detection object according to the three-dimensional coordinate value and the yaw angle of the detection object.

16. The material handling equipment according to claim 1, wherein the third representative point and the fourth representative point are calculated by:

dividing the point cloud cluster corresponding to the target plane region of the one or more reflective components into a plurality of layers at a first interval in a height direction perpendicular to the ground;

calculating a center point of each layer of the plurality of layers to acquire a plurality of center points;

for the first reflective component, calculating a center point of the plurality of center points as the third representative point; and for the second reflective component, calculating a center point of the plurality of center points as the fourth representative point.

17. The material handling equipment according to claim 1, wherein the point cloud of the detection object provided with the one or more reflective components is acquired by a sensor;

the pose of the detection object is a pose of the detection object in a coordinate system of the sensor, and the actions further comprise:

transforming the pose of the detection object in the coordinate system of the sensor into a pose of the detection object in a coordinate system of the material handling equipment through coordinate transformation;

the extracting, from the point cloud of the detection object, point clouds corresponding to the one or more reflective components comprises:

when intensity values of the points in the point cloud of the detection object are greater than a first threshold, identifying the points as the points in the point clouds corresponding to the one or more reflective components; and the actions further comprise:

performing a moving task of the material handling equipment according to the pose of the detection object.

18. A controller comprising at least one processor and at least one memory including instructions, the at least one memory and the instructions configured to, with the at least one processor, cause a material handling equipment at least to perform:

acquiring a point cloud of a detection object provided with one or more reflective components, wherein the one or more reflective components comprise a first reflective component and a second reflective component;

extracting, from the point cloud of the detection object, point clouds corresponding to the one or more reflective components;

determining a target plane region according to the point clouds corresponding to the one or more reflective components; and determining a pose of the detection object according to a pose of the target plane region, wherein the determining a pose of the detection object according to a pose of the target plane region comprises:

respectively calculating a third representative point of the point cloud cluster corresponding to the target plane region of the first reflective component and a fourth representative point of the point cloud cluster corresponding to the target plane region of the second reflective component;

determining a three-dimensional coordinate value of the detection object according to a center point between the third representative point and the fourth representative point;

determining a yaw angle of the detection object according to the target plane region corresponding to the first reflective component and the target plane region corresponding to the second reflective component; and determining the pose of the detection object according to the three-dimensional coordinate value and the yaw angle of the detection object.

19. A pose detection method, comprising:

acquiring a point cloud of a detection object provided with one or more reflective components, wherein the one or more reflective components comprise a first reflective component and a second reflective component;

extracting, from the point cloud of the detection object, point clouds corresponding to the one or more reflective components;

determining a target plane region according to the point clouds corresponding to the one or more reflective components; and determining a pose of the detection object according to a pose of the target plane region, wherein the determining a pose of the detection object according to a pose of the target plane region comprises:

respectively calculating a third representative point of the point cloud cluster corresponding to the target plane region of the first reflective component and a fourth representative point of the point cloud cluster corresponding to the target plane region of the second reflective component;

determining a three-dimensional coordinate value of the detection object according to a center point between the third representative point and the fourth representative point;

determining a yaw angle of the detection object according to the target plane region corresponding to the first reflective component and the target plane region corresponding to the second reflective component; and determining the pose of the detection object according to the three-dimensional coordinate value and the yaw angle of the detection object.

* * * * *